United States Patent [19]

Donnelly

[11] Patent Number: 4,494,010
[45] Date of Patent: Jan. 15, 1985

[54] PROGRAMMABLE POWER CONTROL APPARATUS RESPONSIVE TO LOAD VARIATIONS

[75] Inventor: Albert J. Donnelly, Santa Ana, Calif.

[73] Assignee: Standum Controls, Inc., Santa Ana, Calif.

[21] Appl. No.: 406,138

[22] Filed: Aug. 9, 1982

[51] Int. Cl.³ .............................................. H02J 3/00
[52] U.S. Cl. ...................................... 307/33; 315/195; 315/297; 323/267
[58] Field of Search ....................... 307/11, 24, 31, 33, 307/35, 38; 315/194, 195, 291, 293, 294, 297, 307; 323/267, 255, 258

[56] References Cited
U.S. PATENT DOCUMENTS

3,339,079 8/1967 Kessler ............................. 307/33 X
4,316,136 2/1982 Saxarra et al. ....................... 323/282

Primary Examiner—William M. Shoop
Attorney, Agent, or Firm—Leonard Tachner

[57] ABSTRACT

An apparatus especially adapted for use in AC power systems of the type having a device for reducing power consumption by reducing load voltage, the apparatus having a sensor for detecting an increase in load current and for controlling a responsive increase in load voltage to compensate for the added load causing the increase in current. The apparatus can be used in three-phase AC systems for controlling each phase independently and can be made sufficiently sensitive to operate in a 28,000 Watt fluorescent light load while responding to as little as 400 Watt load additions to assure quick and efficient ignition of newly turned-on lights. A digital memory device, in the form of a state machine in the preferred embodiment, is used to control operation and timing for one to three phases while permitting low line voltage override and periodic timing override operation. The invention may be used advantageously with any type of load, but it is especially useful for lighting loads where there is a non-linear relation between power delivered and light level emitted such as fluorescent or neon lights.

7 Claims, 6 Drawing Figures

PROGRAMMABLE POWER CONTROL APPARATUS RESPONSIVE TO LOAD VARIATIONS

BACKGROUND OF THE INVENTION

1. Field of the Invention

The present invention relates generally to power control apparatus in AC power systems and more specifically, to a programmable power control apparatus adapted for sensing changes in a load such as a bank of fluorescent lights for appropriately changing the voltage applied to the load.

2. Prior Art

The present invention is particularly suited for operation with an apparatus for control of load power consumption of the type described in co-pending patent application Ser. No. 406,410 filing date 8/9/82 now U.S. Pat. No. 4,431,948 issued 2/14/84 and commonly owned by the assignee hereof. That load power consumption control apparatus permits the application of a normal high voltage to a lighting load such as a bank of fluorescent lights and permits selective reduction of the voltage to maintain such lights in a lighting condition but with a reduced power consumption. Typically, the voltage reduction is maintained for a selected period of time and then the voltage is increased automatically for a selective period of time. This is one way of assuring that if any additional lights have been turned on during the low voltage condition, that some time shortly thereafter, a sufficiently high voltage will be applied to ignite the newly added fluorescent light load before the voltage is again reduced. One such periodic power increasing apparatus for use in a similar type of power control apparatus is disclosed in U.S. Pat. No. 4,189,664 to Hirschfeld. In the Hirschfeld apparatus the output voltage is maintained at a reduced level for a majority of the time except that periodically the output voltage is returned to a high level for short periods of time. Each time the output is returned to a high level any fluorescent load on the line can be switched on. Once the fluorescent load is switched on, the voltage is again reduced. Accordingly, this is one prior art manner in which fluorescent loads are operated at a reduced voltage while still permitting fluorescent loads to be turned on at frequent intervals when the output level is returned to a high level. Unfortunately, this scheme for periodic increase in the otherwise reduced power level suffers from a number of disadvantages. For example, in such a prior art apparatus the voltage is increased periodically irrespective of whether additional lights have been turned on. As a result, the average power savings is needlessly diminished, particularly in those systems where additional lighting loads are very infrequently added to the lighting system. Another exemplary disadvantage of such a prior art apparatus stems from the fact that a considerable amount of time may have to elapse before the high voltage is applied to the load in order to start the newly added fluorescent lighting load. Thus for example, if additional lights have been switched on immediately after a previously high voltage condition has been returned to a low voltage condition, a sufficient voltage to start the newly added lights will not be applied until the subsequent voltage increase and as a result the user will have to wait what may be an inconveniently long period of time before the lights are actually ignited and fully on. Thus in such prior art periodic voltage increase systems there is an inherent trade off between the desire to minimize load power consumption as a result of reducing voltage to the load and the desire to provide the users with a minimum of inconvenience in regard to waiting for newly switched on lights to come on fully and provide complete lighting.

SUMMARY OF THE INVENTION

In the present invention the aforementioned disadvantages of the prior art may be entirely overcome by means of a novel programmable apparatus that actually permits sensing of the change in load condition such as when additional lights are turned on in a fluorescent load bank and further permits an immediate response to that change in load condition to increase the voltage level at the load in order to turn on the added light load. Consequently, the present invention makes it possible to turn on newly switched on lights to their full lighting capacity virtually immediately following their application to the circuit so that there is no perceivable inconvenient delay with which the user must suffer. Furthermore, the present invention also makes it possible to maximize the savings in load power consumption by doing away with the unnecessary periodic load voltage increases and to instead apply such increases only when the load conditions change and specifically require such increases for a selected period of time.

It will be seen hereinafter that the present invention actually provides the user with a choice of either a program responsive to voltage increase or a periodic increase as found in the prior art. Furthermore, it will be seen hereinafter that the present invention provides means for detecting when the input line voltage decreases below a selected threshold to thereby select an increased voltage condition to help compensate for such line voltage decrease in an effort to maintain the lighting level or analogous desired condition of the load. Furthermore, it will be seen hereinafter that the present invention utilizes a switching circuit that may be synchronized to the frequency of the input line voltage rendering it possible to synchronize the load voltage change with a selected characteristic of the input power such as minimum current to reduce the effects of noise, or minimum voltage to reduce the effects of arcing. It will also be seen hereinafter that the present invention provides means for selecting a number of alternative periods of increased voltage condition in accordance with the user's desires and depending upon the nature of the newly applied load.

It will be seen hereinafter that the present invention comprises a current sensing transformer, a current sensor circuit and a state machine, the latter of which comprises a programmed digital circuit including a programmable read only memory for controlling the application and sequence of voltage increase for changed load conditions such as the application of additional fluorescent lights turned on in a fluorescent light load bank. The present invention also comprises a plurality of timing circuits and a voltage threshold circuit which are operatively interconnected with the state machine in order to provide the desired application and timing of the increased voltage condition as will be understood more fully hereinafter.

The present invention may be used advantageously with any type of load, but it is especially useful for lighting loads where there is a non-linear relation between power delivered and light level emitted such as fluorescent or other gas-discharge lights. Another particularly advantageous application is for control of the voltage applied to synchronous motors.

OBJECTS OF THE INVENTION

It is therefore a principal object of the present invention to provide a power control apparatus that is responsive to load variations and is therefore adapted to promote the savings of load power consumption when operated in conjunction with load power control devices such as that disclosed in co-pending patent application Ser. No. 406,410 filed 8/9/82 now U.S. Pat. No. 4,431,948 issued 2/14/84.

It is an additional object of the present invention to provide a programmable power control apparatus that is responsive to load variations to provide needed load voltage increases in a manner that overcomes the aforementioned disadvantages of analogous prior art devices.

It is still an additional object of the present invention to provide a programmable power control apparatus responsive to load variations to at least temporarily increase the power applied to such loads while simultaneously responding to decreased line voltage conditions to also increase the voltage applied to such loads.

It is still an additional object of the present invention to provide a power control apparatus that is particularly adapted for use with fluorescent light load systems, an apparatus of the type for reducing load power consumption for such light systems and which senses relatively small increases in the applied load that may for example, be due to the activation of a small number of additional lights in such a load and responds thereto by temporarily increasing the applied load voltage for a selected period of time in order to apply sufficient starting voltage to such added lights.

It is still an additional object of the present invention to provide a power control apparatus which is adapted for use with virtually any type of load, but is of particular advantage when used with lighting loads where there is a non-linear relation between power delivered and light level emitted such as fluorescent or other gas-discharge type lights.

BRIEF DESCRIPTION OF THE DRAWINGS

The aforementioned objects and advantages of the present invention as well as additional objects and advantages thereof will be more fully understood hereinafter as a result of a detailed description of a preferred embodiment of the invention when taken in conjunction with the accompanying drawings in which.

DETAILED DESCRIPTION OF A PREFERRED EMBODIMENT OF THE INVENTION

Figure 1:
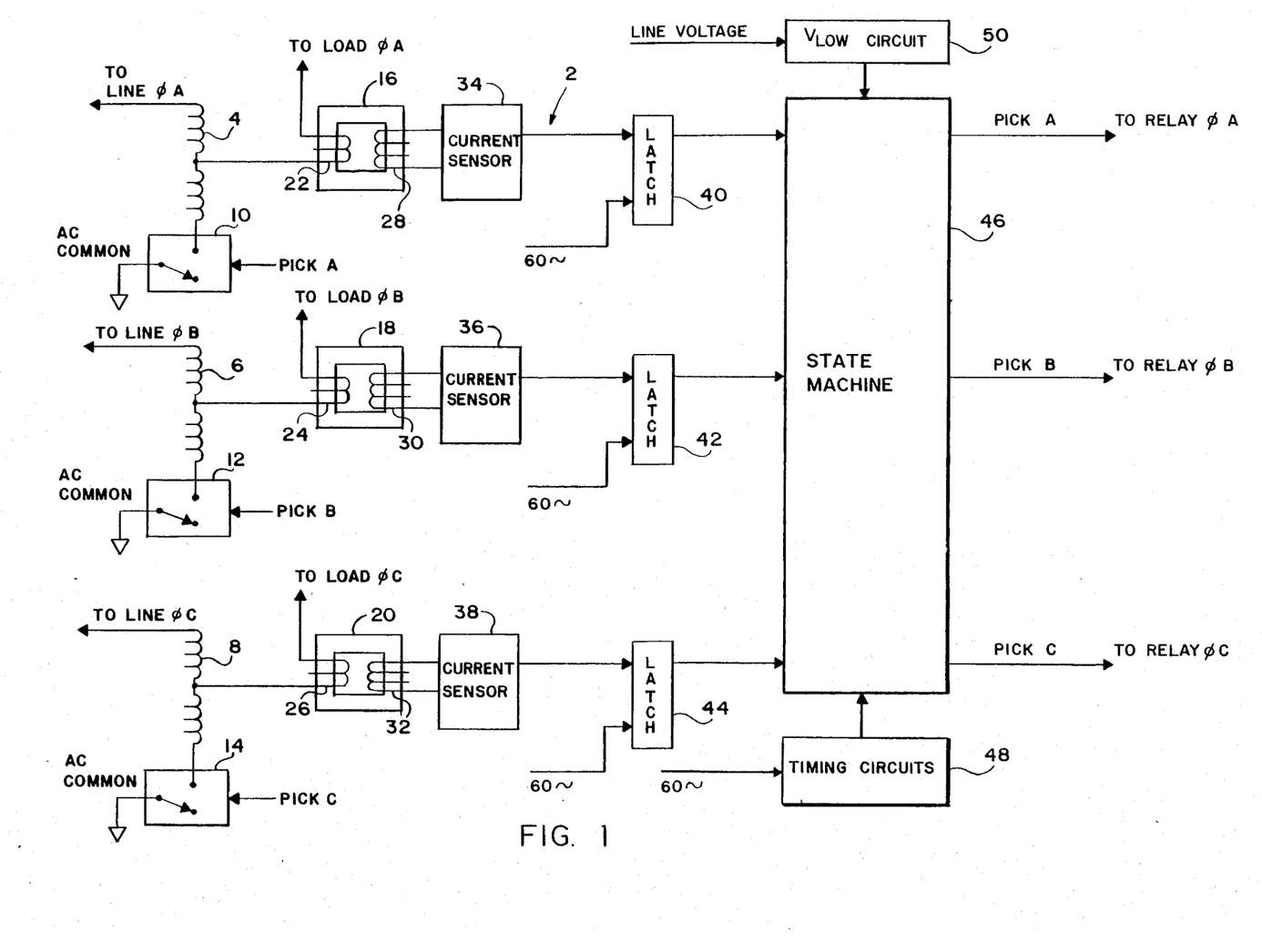
FIG. 1 is a block diagram representation of the present invention.

Referring now to FIG. 1 there is shown therein a power control apparatus 2 of the present invention. Apparatus 2 is shown connected to three autotransformers 4, 6 and 8 and three corresponding relays 10, 12 and 14, respectively. It is to be understood that the autotransformers 4, 6 and 8 and relays 10, 12 and 14 correspond to the invention disclosed and claimed in co-pending patent application Ser. No. 406,410 filed 8/9/82 now U.S. Pat. No. 4,431,948 issued 2/14/84 and are included herein only as exemplary of apparatus with which the present invention may be utilized. It will be understood that the present invention may also be utilized with a variety of load consumption control apparatus including those described as prior art in the aforementioned co-pending patent application.

The present invention comprises a plurality of transformers 16, 18 and 20 each having a primary winding 22, 24 and 26, respectively and a secondary winding 28, 30 and 32, respectively. The primary winding of each transformer is connected in series between a corresponding autotransformer and the load of a three-phase AC system in order to provide an indication of the level of current in each such load output. Moreover, the secondary winding of each such transformer is connected to a corresponding current sensor 34, 36 and 38 respectively. The respective output terminals of each sensor provide a signal indicative of whether the load current in the respective phase has undergone a sudden increase such as would result if for example, additional fluorescent lights had been turned on thereby reducing the equivalent load impedance of a bank of fluorescent lights. The output terminals of current sensors 34, 36 and 38 are applied respectively to latches 40, 42 and 44 which, it is seen in FIG. 1, also receive a 60 cycle timing signal. It will be seen hereinafter that the entire operation of the invention is synchronized to a 60 cycle timing signal derived from the line voltage frequency thereby making it possible to open or close relays 10, 12 and 14 at a time corresponding to a selected value of load current or load voltage. By way of example, if it is desired to minimize the noise effects resulting from activation of a load voltage change by means of the present invention, it would be advantageous to open and close the relays at a minimum of current. On the other hand, if it is desirable to change load voltge whereby to minimize arcing in the relays, it would be advantageous to open and close the relays at a voltage minimum. Synchronization of the operation of the present invention to the 60 cycle AC frequency makes it possible to select either one of these minimums or to select any other timing for relay opening and closure to effect the most desirable compromise for minimum noise and arcing.

The output of the latches 40, 42 and 44 are applied to a state machine 46. Also connected to the state machine 46 are the timing circuits 48 and a threshold circuit 50. Latches 40, 42 and 44 and state machine 46 will be described in more detail hereinafter in conjunction with FIG. 4. Timing circuits 48 will be described in more detail in conjunction with FIG. 5 and threshold circuit 50 will be described in more detail in conjunction with FIG. 6. However, it will be seen hereinafter that the timing circuits 48 provide the desired delay in activation of the invention while threshold circuit 50, which is connected to a selected phase of the input line voltage, provides an indication of whether that line voltage is above or below a selected threshold in order to activate a system override function which maintains the higher voltage applied to the load whenever the input line voltage falls below the selected threshold level.

The principal output signals of state machine 46 comprise the pick A, pick B and pick C signals which, as seen in FIG. 1, are applied respectively to relay phase A 10 relay phase B 12 and relay phase C 14 for control of those respective relays, the positions of which determine whether the voltage applied to the load is high or low.

Figure 2:
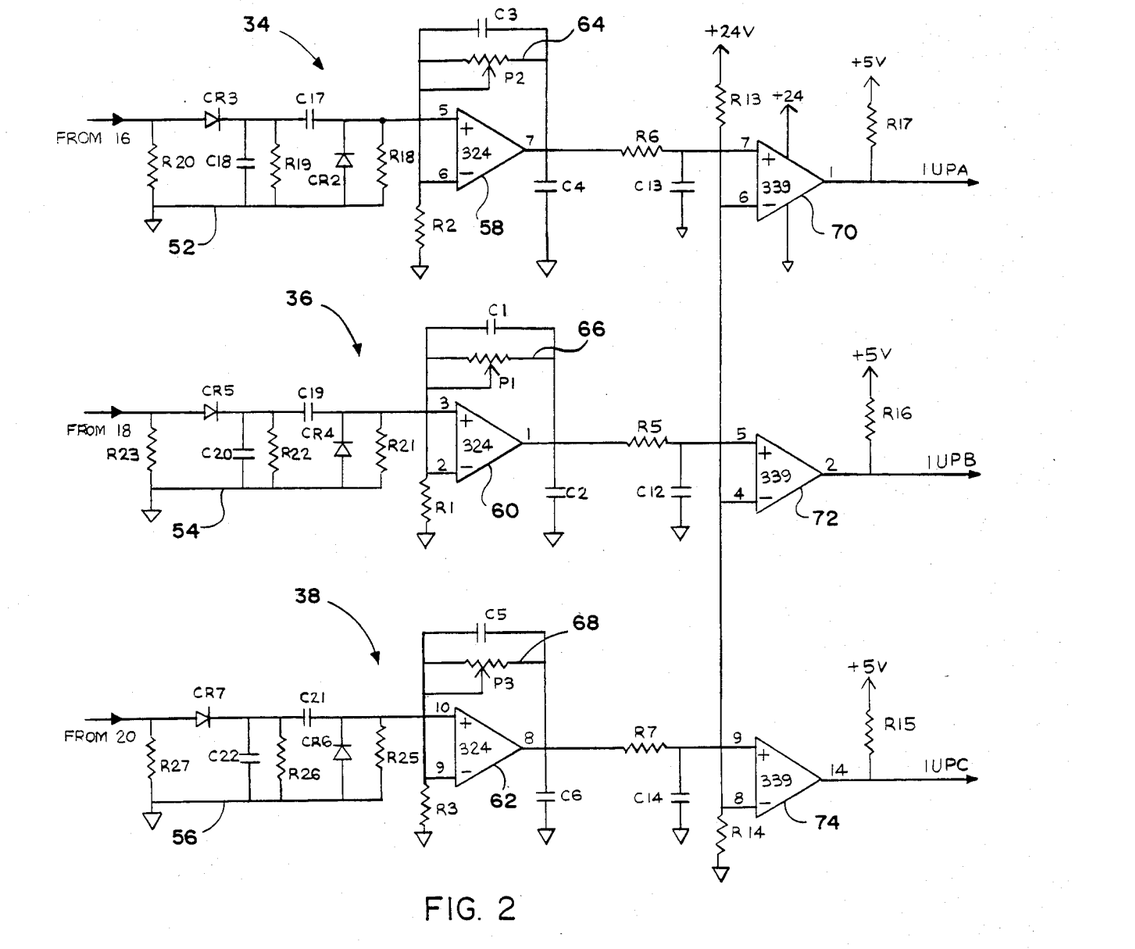
FIG. 2 is a schematic drawing of the current sensors of the present invention.

Reference will now be made to FIG. 2 for a more detailed description of the current sensors 34, 36 and 38 of the present invention. Each such current sensor is identical and comprises respective input networks 52, 54 and 56, respective operational amplifiers 58, 60 and 62, respective gain control circuits 64, 66 and 68 and respective comparator circuits 70, 72 and 74.

Each input network 52, 54 and 56 comprises an input load resistor such as R20 which is designed to damp the current transformer secondary winding to which each current sensor is connected as indicated previously in conjunction with FIG. 1. The input networks also comprise a rectifier diode along with a filter, and AC coupling including an RC network designed to apply a positive pulse to the positive input of each operational amplifier to which the network is connected. Each operational amplifier 58, 60 and 62 acts in conjunction with a respective gain control feedback network 64, 66 and 68 to amplify the input pulse by a gain factor dependent upon the setting of the feedback potentiometer P1, P2 and P3, respectively. The amplifier output pulse of each operational amplifier is applied to a comparator network 70, 72 and 74, respectively. Each such amplified pulse applied to a comparator network is compared by the respective comparators to a reference voltage determined by the ratio of resistors R13 and R14 which form a voltage divider network connected to the negative terminals of each such comparator. In this manner, three pulse signals IUPA, IUPB and IUPC, respectively are formed in response to a sufficient increase in load current, in each of the three respective phases of the AC system to which the invention is connected. It should be understood that an IUP signal will be developed in any one, two or three of the three phases independent of the others depending upon the load current changes in the respective input phase of the AC system and that the present invention is designed to operate as requied to increase the voltage in any number of the three phases as required. This is another clear advantage over the prior art which teaches the periodic increase of voltage in all three phases simultaneously even when load changes may be occurring in only one phase of the power system. It will be seen therefore that the present invention provides a distinct advantage in power consumption efficiency as a result of independent phase operation as well as load current responsiveness.

It will also be noted that the sensitivity of each current sensor 34, 36 and 38 may be independently controlled by means of the gain control 64, 66 and 68, respectively. Each such gain control may be adjusted to render a current sensor relatively insensitive to slight current changes due to, for example, line voltage dips which may not be sufficient to require a concomitant increase in load voltage. Furthermore, it will also be observed that the gain of each Op amp in each current sensor may be adjusted to render the current sensor more sensitive, if desired, in one particular phase than the other two phases. This would be advantageous for example, where a large number of independently operated light switches are installed for light loads connected to only one phase of a three phase system. In such a configuration it may be advantageous to adjust the current sensor for that particular phase to be more sensitive in order to allow the system to respond to the turning on of individual light switches for only a small number of fluorescent lights while keeping the other two phase current sensors relatively insensitive where there is no need to respond to small current changes.

Finally, with respect to FIG. 2 it should be noted that the state machine, to be discussed in more detail hereinafter in conjunction with FIG. 4, renders the system relatively insensitive to pulse signals IUPA, IUPB and IUPC of short duration, namely, shorter than two cycles of the 60 cycle AC frequency. Although the responsiveness to pulse duration may be selected in the state machine, it has been found that when the present system is used for fluorescent light loads, current sensed signals of substantially less than two AC 60 cycle durations are due to current increases caused by events other than the turning on of additional lights in the load such as, for example, spurious signal transients due to noise and the like.

Figure 3:
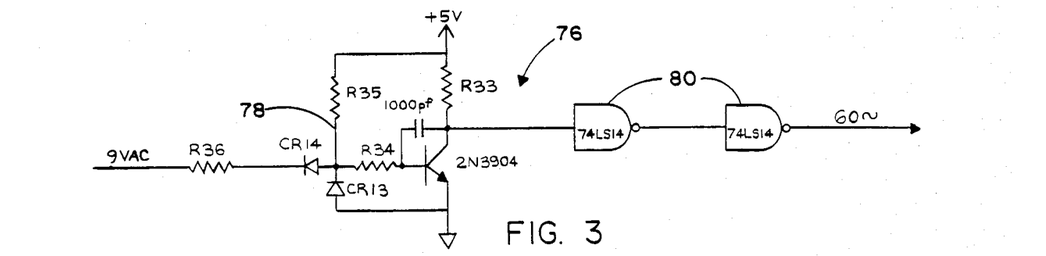
FIG. 3 is a schematic drawing of a circuit used in the present invention for converting alternating current to pulsed TTL logic.

FIG. 3 is a schematic illustration of a converter used to develope TTL digital clock pulses from the 60 cycle sinewave available at the line voltage. More specifically, a reduced AC voltage developed in a well-known manner using, by way of example, a step-down transformer, is applied to a chopper circuit 78 which converts the alternating current signal into a 5 volt squarewave which is then applied to a pair of integrated circuit Schmitt Triggers the output of which is a 60 Hertz pulsed signal that is synchronized to the AC signal at the line. As indicated earlier, this 60 Hertz signal is applied to the digital circuits of the present invention comprising the state machine of FIG. 4 and the timing circuits of FIG. 5 which will now be described in more detail.

Figure 4:
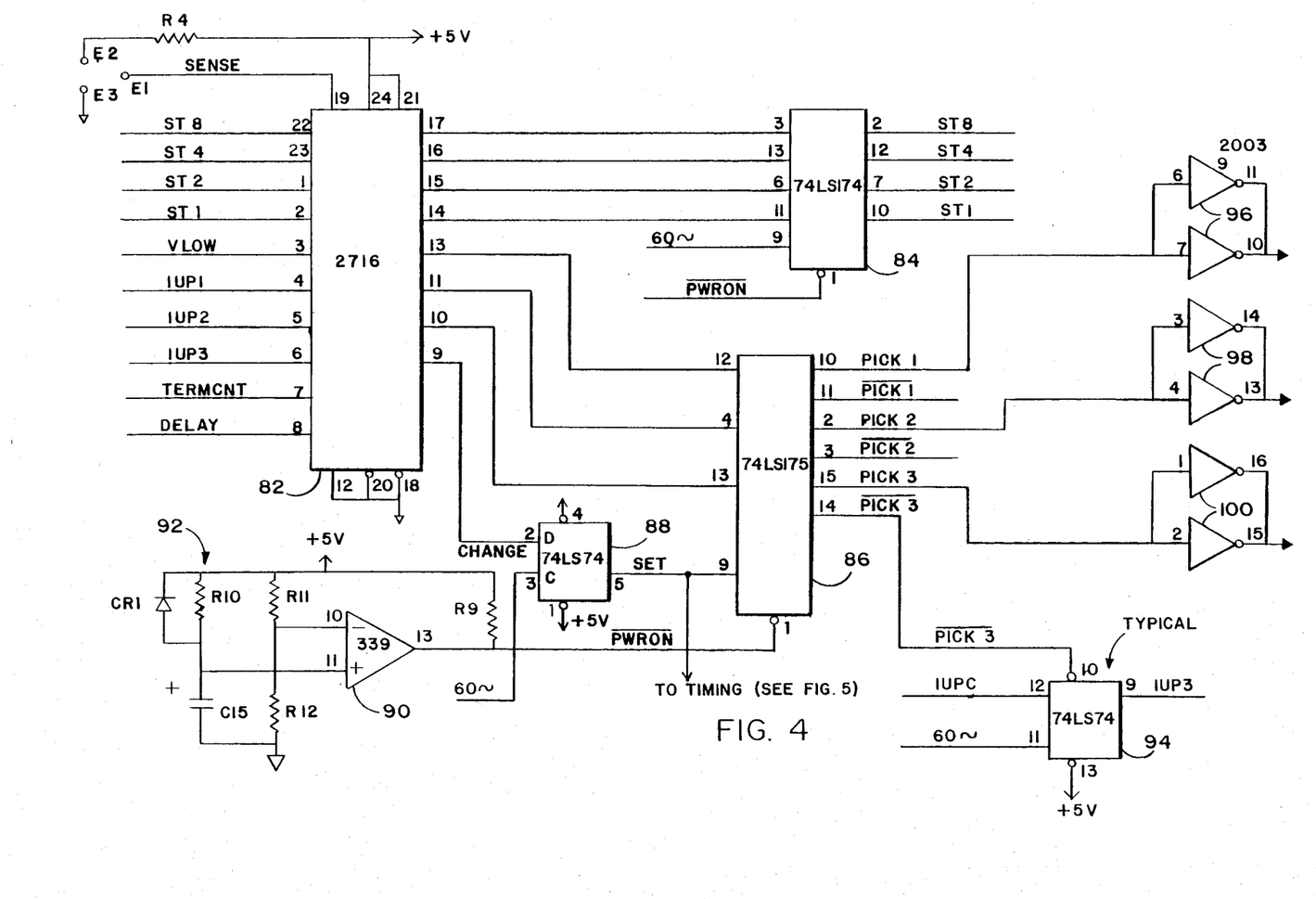
FIG. 4 is a block diagram schematic representation of the state machine of the present invention.

Referring now to FIG. 4 it is seen that the state machine of the present invention comprises a programmable read only memory (PROM) 82, a latch 84, a quad flip-flop 86, an individual flip-flop 88, a comparator 90, a delay circuit 92, a flip-flop 94, and a plurality of buffers 96, 98 and 100. PROM 82 which by way of example may be a Texas Instruments Model TMS 2716JL 2048×8 programmable read only memory has 11 address lines and 8 output data lines. All of the address lines are shown on the left side of the chip as seen in FIG. 4 and all of the data lines are on the right side of the chip as shown in FIG. 4. The four top address lines as seen in FIG. 4 are identified as state 8 (ST8), state 4 (ST4), state 2 (ST2) and state 1 (ST1). It is seen that these four state signals are derived from the top 4 data output lines which are connected to latch 84 the output of which is fed back to the address lines as the state signals. It is primarily the feedback routing of the state signals through PROM 82 which denotes the PROM and its associated circuitry as a state machine and in effect causes the PROM to carry out a series of steps or "states" in response to the 60 cycle TTL pulse applied to the clock terminal of the latch 84.

Additional input signals applied to the address terminals of PROM 82 include the Vlow signal which is derived from the threshold circuit 50 which will be described hereinafter in more detail in conjunction with FIG. 6. The address inputs also include three IUP signals developed from the current sensor circuits of FIG. 2 and the latches of the type including latch 94 which will be described hereinafter; the "terminal count signal" (TERMCNT) and a delay signal. The latter two signals will be described hereinafter in conjunction with the description of the timing circuits of FIG. 5 below. Three additional output signals of PROM 82 include three signals out of the data terminals applied to quad flip-flop 86 which is used to generate the pick signals that are applied to the relays of FIG. 1 and one additional output signal which is denoted the "change signal" (CHANGE) and which is applied to a flip-flop 88 to develop a set signal which in turn is applied as the clock signal to quad flip-flops 86 and to the timing circuits of FIG. 5. One additional address input is the sense line which may be jumpered to either pull-up resistor R4 or ground depending upon whether the invention is to be operated in a straight timing mode wherein the voltage increase occurs periodically irrespective of the load current conditions or in a sense mode in which the voltage increases occur in response to the sensed current increases in the load as discussed above.

The contents of PROM 82 are listed in binary format in Table I which will enable those having skill in the art to which the present invention pertains to practice the invention by programming a suitable PROM in accordance with Table I. The PROM therefore provides the programmable means for sequencing through a series of states for controlling the operation of the invention. This sequence of states and the resultant operation will be discussed more fully hereinafter in conjunction with Table II. The purpose of latch 84 is to synchronize the state signal changes to the 60 cycle signal developed as previously described in conjunction with FIG. 3. The purpose of quad flip-flop 86 is to prevent any inadvertent change in the signals applied to the relays, namely, the pick signals, while the PROM/state machine undergoes a variety of changes during a normal operational sequence. Only when a relay change signal output from PROM 82 is applied to the D terminal of flip-flop 88, thereby generating a true set signal applied to quad flip-flop 86, will the output of quad flip-flop 86 be permitted to change in accordance with the input signals from terminals 10, 11 and 13 of PROM 82.

TABLE I

| | | | | | | | | |
|---|---|---|---|---|---|---|---|---|
| 2000- | 10 | 10 | 10 | 10 | 10 | 10 | 10 | 10 State 0 |
| 2008- | 10 | 10 | 10 | 10 | 10 | 10 | 10 | 10 |
| 2010- | 10 | 10 | 10 | 10 | 10 | 10 | 10 | 10 Start |
| 2018- | 10 | 10 | 10 | 10 | 10 | 10 | 10 | 10 Sensor Mode |
| 2020- | 10 | 10 | 10 | 10 | 10 | 10 | 10 | 10 |
| 2040- | 21 | 21 | 21 | 21 | 21 | 21 | 21 | 21 State 1 |
| 2048- | 21 | 21 | 21 | 21 | 21 | 21 | 21 | 21 |
| 2050- | 21 | 21 | 21 | 21 | 21 | 21 | 21 | 21 Set Hi V |
| 2058- | 21 | 21 | 21 | 21 | 21 | 21 | 21 | 21 |
| 2060- | 21 | 21 | 21 | 21 | 21 | 21 | 21 | 21 |
| 2068- | 21 | 21 | 21 | 21 | 21 | 21 | 21 | 21 |
| 2070- | 21 | 21 | 21 | 21 | 21 | 21 | 21 | 21 |
| 2078- | 21 | 21 | 21 | 21 | 21 | 21 | 21 | 21 |
| 2080- | F0 | F0 | F0 | F0 | F0 | F0 | F0 | F0 State 2 |
| 2088- | F0 | F0 | F0 | F0 | F0 | F0 | F0 | F0 |
| 2090- | F0 | F0 | F0 | F0 | F0 | F0 | F0 | F0 Go to State "F" (Delay) |
| 2098- | F0 | F0 | F0 | F0 | F0 | F0 | F0 | F0 Check Vlow |
| 20A0- | 10 | 10 | 10 | 10 | 10 | 10 | 10 | 10 |
| 20A8- | 10 | 10 | 10 | 10 | 10 | 10 | 10 | 10 |
| 20B0- | 10 | 10 | 10 | 10 | 10 | 10 | 10 | 10 |
| 20B8- | 10 | 10 | 10 | 10 | 10 | 10 | 10 | 10 |
| 20C0- | 4F | 4F | 4F | 4F | 4F | 4F | 4F | 4F State 3 |
| 20C8- | 4F | 4F | 4F | 4F | 4F | 4F | 4F | 4F |
| 20D0- | 4F | 4F | 4F | 4F | 4F | 4F | 4F | 4F Set low V |
| 20D8- | 4F | 4F | 4F | 4F | 4F | 4F | 4F | 4F Check Vlow |
| 20E0- | 10 | 10 | 10 | 10 | 10 | 10 | 10 | 10 |
| 20E8- | 10 | 10 | 10 | 10 | 10 | 10 | 10 | 10 |
| 20F0- | 10 | 10 | 10 | 10 | 10 | 10 | 10 | 10 |
| 20F8- | 10 | 10 | 10 | 10 | 10 | 10 | 10 | 10 |
| 2100- | 40 | 50 | 40 | 50 | 40 | 50 | 40 | 50 State 4 |
| 2108- | 40 | 50 | 40 | 50 | 40 | 50 | 40 | 50 |
| 2110- | 40 | 50 | 40 | 50 | 40 | 50 | 40 | 50 Delay |
| 2118- | 40 | 50 | 40 | 50 | 40 | 50 | 40 | 50 Check Vlow |
| 2120- | 10 | 10 | 10 | 10 | 10 | 10 | 10 | 10 |
| 2128- | 10 | 10 | 10 | 10 | 10 | 10 | 10 | 10 |
| 2130- | 10 | 10 | 10 | 10 | 10 | 10 | 10 | 10 |
| 2138- | 10 | 10 | 10 | 10 | 10 | 10 | 10 | 10 |
| 2140- | 50 | 50 | 50 | 50 | 60 | 60 | 60 | 60 State 5 |
| 2148- | 60 | 60 | 60 | 60 | 60 | 60 | 60 | 60 |
| 2150- | 60 | 60 | 60 | 60 | 60 | 60 | 60 | 60 Wait for Iup |
| 2158- | 60 | 60 | 60 | 60 | 60 | 60 | 60 | 60 Check Vlow |
| 2160- | 10 | 10 | 10 | 10 | 10 | 10 | 10 | 10 |
| 2168- | 10 | 10 | 10 | 10 | 10 | 10 | 10 | 10 |
| 2170- | 10 | 10 | 10 | 10 | 10 | 10 | 10 | 10 |
| 2178- | 10 | 10 | 10 | 10 | 10 | 10 | 10 | 10 |
| 2180- | 50 | 50 | 50 | 50 | 7D | 7D | 7D | 7D State 6 |
| 2188- | 7B | 7B | 7B | 7B | 79 | 79 | 79 | 79 |
| 2190- | 77 | 77 | 77 | 77 | 75 | 75 | 75 | 75 Set Individual Hi V |
| 2198- | 73 | 73 | 73 | 73 | 71 | 71 | 71 | 71 Check Vlow |
| 21A0- | 10 | 10 | 10 | 10 | 10 | 10 | 10 | 10 |
| 21A8- | 10 | 10 | 10 | 10 | 10 | 10 | 10 | 10 |
| 21B0- | 10 | 10 | 10 | 10 | 10 | 10 | 10 | 10 |
| 21B8- | 10 | 10 | 10 | 10 | 10 | 10 | 10 | 10 |
| 21C0- | 30 | 30 | 30 | 30 | A0 | A0 | A0 | A0 State 7 |
| 21C8- | 90 | 90 | 90 | 90 | E0 | E0 | E0 | E0 |
| 21D0- | 80 | 80 | 80 | 80 | C0 | C0 | C0 | C0 Multiple Way Branch |
| 21D8- | B0 | B0 | B0 | B0 | D0 | D0 | D0 | D0 Check Vlow |
| 21E0- | 10 | 10 | 10 | 10 | 10 | 10 | 10 | 10 |
| 21E8- | 10 | 10 | 10 | 10 | 10 | 10 | 10 | 10 |
| 21F0- | 10 | 10 | 10 | 10 | 10 | 10 | 10 | 10 |
| 21F8- | 10 | 10 | 10 | 10 | 10 | 10 | 10 | 10 |
| 2200- | 40 | 40 | 40 | 40 | 40 | 40 | 40 | 40 State 8 (Iup1) |
| 2208- | 40 | 40 | 40 | 40 | 40 | 40 | 40 | 40 |
| 2210- | 80 | 80 | 30 | 30 | 40 | 40 | 40 | 40 Wait for Term CNT |
| 2218- | 40 | 40 | 40 | 40 | 40 | 40 | 40 | 40 Wait for Another Iup |
| 2220- | 10 | 10 | 10 | 10 | 10 | 10 | 10 | 10 Check Vlow |
| 2228- | 10 | 10 | 10 | 10 | 10 | 10 | 10 | 10 |
| 2230- | 10 | 10 | 10 | 10 | 10 | 10 | 10 | 10 |
| 2238- | 10 | 10 | 10 | 10 | 10 | 10 | 10 | 10 |
| 2240- | 40 | 40 | 40 | 40 | 40 | 40 | 40 | 40 State 9 (Iup2) |
| 2248- | 90 | 90 | 30 | 30 | 40 | 40 | 40 | 40 |
| 2250- | 40 | 40 | 40 | 40 | 40 | 40 | 40 | 40 Wait for Term CNT |
| 2258- | 40 | 40 | 40 | 40 | 40 | 40 | 40 | 40 Wait for Another Iup |
| 2260- | 10 | 10 | 10 | 10 | 10 | 10 | 10 | 10 Check Vlow |
| 2268- | 10 | 10 | 10 | 10 | 10 | 10 | 10 | 10 |
| 2270- | 10 | 10 | 10 | 10 | 10 | 10 | 10 | 10 |
| 2278- | 10 | 10 | 10 | 10 | 10 | 10 | 10 | 10 |
| 2280- | 40 | 40 | 40 | 40 | A0 | A0 | 30 | 30 State A (Iup3) |
| 2288- | 40 | 40 | 40 | 40 | 40 | 40 | 40 | 40 |
| 2290- | 40 | 40 | 40 | 40 | 40 | 40 | 40 | 40 Wait for Term CNT |
| 2298- | 40 | 40 | 40 | 40 | 40 | 40 | 40 | 40 Wait for Another Iup |
| 22A0- | 10 | 10 | 10 | 10 | 10 | 10 | 10 | 10 Check Vlow |
| 22A8- | 10 | 10 | 10 | 10 | 10 | 10 | 10 | 10 |
| 22B0- | 10 | 10 | 10 | 10 | 10 | 10 | 10 | 10 |
| 22B8- | 10 | 10 | 10 | 10 | 10 | 10 | 10 | 10 |
| 22C0- | 40 | 40 | 40 | 40 | 40 | 40 | 40 | 40 State B (Iup1,2) |
| 22C8- | 40 | 40 | 40 | 40 | 40 | 40 | 40 | 40 |
| 22D0- | 40 | 40 | 40 | 40 | 40 | 40 | 40 | 40 Wait for Term CNT |
| 22D8- | B0 | B0 | 30 | 30 | 40 | 40 | 40 | 40 Wait for Another Iup |
| 22E0- | 10 | 10 | 10 | 10 | 10 | 10 | 10 | 10 Check Vlow |
| 22E8- | 10 | 10 | 10 | 10 | 10 | 10 | 10 | 10 |
| 22F0- | 10 | 10 | 10 | 10 | 10 | 10 | 10 | 10 |
| 22F8- | 10 | 10 | 10 | 10 | 10 | 10 | 10 | 10 |
| 2300- | 40 | 40 | 40 | 40 | 40 | 40 | 40 | 40 State C (Iup1,3) |
| 2308- | 40 | 40 | 40 | 40 | 40 | 40 | 40 | 40 |
| 2310- | 40 | 40 | 40 | 40 | C0 | C0 | 30 | 30 Wait for Team CNT |
| 2318- | 40 | 40 | 40 | 40 | 40 | 40 | 40 | 40 Wait for Another Iup |
| 2320- | 10 | 10 | 10 | 10 | 10 | 10 | 10 | 10 Check Vlow |
| 2328- | 10 | 10 | 10 | 10 | 10 | 10 | 10 | 10 |
| 2330- | 10 | 10 | 10 | 10 | 10 | 10 | 10 | 10 |
| 2338- | 10 | 10 | 10 | 10 | 10 | 10 | 10 | 10 |
| 2340- | 40 | 40 | 40 | 40 | 40 | 40 | 40 | 40 State D (Iup1,2,3) |
| 2348- | 40 | 40 | 40 | 40 | 40 | 40 | 40 | 40 |
| 2350- | 40 | 40 | 40 | 40 | 40 | 40 | 40 | 40 Wait for Term CNT |
| 2358- | 40 | 40 | 40 | 40 | D0 | D0 | 30 | 30 Wait for Another Iup |
| 2360- | 10 | 10 | 10 | 10 | 10 | 10 | 10 | 10 Check Vlow |
| 2368- | 10 | 10 | 10 | 10 | 10 | 10 | 10 | 10 |
| 2370- | 10 | 10 | 10 | 10 | 10 | 10 | 10 | 10 |
| 2378- | 10 | 10 | 10 | 10 | 10 | 10 | 10 | 10 |
| 2380- | 40 | 40 | 40 | 40 | 40 | 40 | 40 | 40 State E (Iup2,3) |
| 2388- | 40 | 40 | 40 | 40 | E0 | E0 | 30 | 30 |
| 2390- | 40 | 40 | 40 | 40 | 40 | 40 | 40 | 40 Wait for Term CNT |
| 2398- | 40 | 40 | 40 | 40 | 40 | 40 | 40 | 40 Wait for Another Iup |

TABLE I-continued

| | | | | | | | | | |
|---|---|---|---|---|---|---|---|---|---|
| 23A0- | 10 | 10 | 10 | 10 | 10 | 10 | 10 | 10 | Check Vlow |
| 23A8- | 10 | 10 | 10 | 10 | 10 | 10 | 10 | | |
| 23B0- | 10 | 10 | 10 | 10 | 10 | 10 | 10 | | |
| 23B8- | 10 | 10 | 10 | 10 | 10 | 10 | 10 | | |
| 23C0- | F0 | F0 | 30 | 30 | F0 | F0 | 30 | 30 | State F |
| 23C8- | F0 | F0 | 30 | 30 | F0 | F0 | 30 | 30 | |
| 23D0- | F0 | F0 | 30 | 30 | F0 | F0 | 30 | 30 | Wait for Term CNT |
| 23D8- | F0 | F0 | 30 | 30 | F0 | F0 | 30 | 30 | Go to 3 |
| 23E0- | F0 | F0 | 30 | 30 | F0 | F0 | 30 | 30 | |
| 23E8- | F0 | F0 | 30 | 30 | F0 | F0 | 30 | 30 | |
| 23F0- | F0 | F0 | 30 | 30 | F0 | F0 | 30 | 30 | |
| 23F8- | F0 | F0 | 30 | 30 | F0 | F0 | 30 | 30 | |
| 2400- | 10 | 10 | 10 | 10 | 10 | 10 | 10 | 10 | State 10 |
| 2408- | 10 | 10 | 10 | 10 | 10 | 10 | 10 | | |
| 2410- | 10 | 10 | 10 | 10 | 10 | 10 | 10 | 10 | Start |
| 2418- | 10 | 10 | 10 | 10 | 10 | 10 | 10 | | Timer Mode |
| 2420- | 10 | 10 | 10 | 10 | 10 | 10 | 10 | | |
| 2428- | 10 | 10 | 10 | 10 | 10 | 10 | 10 | | |
| 2430- | 10 | 10 | 10 | 10 | 10 | 10 | 10 | | |
| 2438- | 10 | 10 | 10 | 10 | 10 | 10 | 10 | | |
| 2440- | 21 | 21 | 21 | 21 | 21 | 21 | 21 | 21 | State 11 |
| 2448- | 21 | 21 | 21 | 21 | 21 | 21 | 21 | | |
| 2450- | 21 | 21 | 21 | 21 | 21 | 21 | 21 | 21 | Set Hi V |
| 2458- | 21 | 21 | 21 | 21 | 21 | 21 | 21 | | |
| 2460- | 21 | 21 | 21 | 21 | 21 | 21 | 21 | | |
| 2468- | 21 | 21 | 21 | 21 | 21 | 21 | 21 | | |
| 2470- | 21 | 21 | 21 | 21 | 21 | 21 | 21 | | |
| 2478- | 21 | 21 | 21 | 21 | 21 | 21 | 21 | | |
| 2480- | 20 | 30 | 20 | 30 | 20 | 30 | 20 | 30 | State 12 |
| 2488- | 20 | 30 | 20 | 30 | 20 | 30 | 20 | | |
| 2490- | 20 | 30 | 20 | 30 | 20 | 30 | 20 | 30 | Wait for Delay |
| 2498- | 20 | 30 | 20 | 30 | 20 | 30 | 20 | 30 | Check Vlow |
| 24A0- | 10 | 10 | 10 | 10 | 10 | 10 | 10 | | |
| 24A8- | 10 | 10 | 10 | 10 | 10 | 10 | 10 | | |
| 24B0- | 10 | 10 | 10 | 10 | 10 | 10 | 10 | | |
| 24B8- | 10 | 10 | 10 | 10 | 10 | 10 | 10 | | |
| 24C0- | 4F | 4F | 4F | 4F | 4F | 4F | 4F | 4F | State 13 |
| 24C8- | 4F | 4F | 4F | 4F | 4F | 4F | 4F | | |
| 24D0- | 4F | 4F | 4F | 4F | 4F | 4F | 4F | 4F | Set low V |
| 24D8- | 4F | 4F | 4F | 4F | 4F | 4F | 4F | 4F | Check Vlow |
| 24E0- | 10 | 10 | 10 | 10 | 10 | 10 | 10 | | |
| 24E8- | 10 | 10 | 10 | 10 | 10 | 10 | 10 | | |
| 24F0- | 10 | 10 | 10 | 10 | 10 | 10 | 10 | | |
| 24F8- | 10 | 10 | 10 | 10 | 10 | 10 | 10 | | |
| 2500- | 40 | 40 | 10 | 10 | 40 | 40 | 10 | 10 | State 14 |
| 2508- | 40 | 40 | 10 | 10 | 40 | 40 | 10 | | |
| 2510- | 40 | 40 | 10 | 10 | 40 | 40 | 10 | | |
| 2518- | 40 | 40 | 10 | 10 | 40 | 40 | 10 | | |
| 2520- | 10 | 10 | 10 | 10 | 10 | 10 | 10 | | |
| 2528- | 10 | 10 | 10 | 10 | 10 | 10 | 10 | | |
| 2530- | 10 | 10 | 10 | 10 | 10 | 10 | 10 | | |
| 2538- | 10 | 10 | 10 | 10 | 10 | 10 | 10 | | |
| 2540- | 10 | 10 | 10 | 10 | 10 | 10 | 10 | 10 | State 15 |
| 2548- | 10 | 10 | 10 | 10 | 10 | 10 | 10 | | |
| 2550- | 10 | 10 | 10 | 10 | 10 | 10 | 10 | 10 | NDT used |
| 2558- | 10 | 10 | 10 | 10 | 10 | 10 | 10 | | |
| 2560- | 10 | 10 | 10 | 10 | 10 | 10 | 10 | | |
| 2568- | 10 | 10 | 10 | 10 | 10 | 10 | 10 | | |
| 2570- | 10 | 10 | 10 | 10 | 10 | 10 | 10 | | |
| 2578- | 10 | 10 | 10 | 10 | 10 | 10 | 10 | | |
| 2580- | 10 | 10 | 10 | 10 | 10 | 10 | 10 | | |
| 2588- | 10 | 10 | 10 | 10 | 10 | 10 | 10 | | |
| 2590- | 10 | 10 | 10 | 10 | 10 | 10 | 10 | 10 | State 16 |
| 2598- | 10 | 10 | 10 | 10 | 10 | 10 | 10 | | |
| 25A0- | 10 | 10 | 10 | 10 | 10 | 10 | 10 | 10 | Not used |
| 25A8- | 10 | 10 | 10 | 10 | 10 | 10 | 10 | | |
| 25B0- | 10 | 10 | 10 | 10 | 10 | 10 | 10 | | |
| 25B8- | 10 | 10 | 10 | 10 | 10 | 10 | 10 | | |
| 25C0- | 10 | 10 | 10 | 10 | 10 | 10 | 10 | 10 | State 17 |
| 25C8- | 10 | 10 | 10 | 10 | 10 | 10 | 10 | | |
| 25D0- | 10 | 10 | 10 | 10 | 10 | 10 | 10 | 10 | Not used |
| 25D8- | 10 | 10 | 10 | 10 | 10 | 10 | 10 | | |
| 25E0- | 10 | 10 | 10 | 10 | 10 | 10 | 10 | | |
| 25E8- | 10 | 10 | 10 | 10 | 10 | 10 | 10 | | |
| 25F0- | 10 | 10 | 10 | 10 | 10 | 10 | 10 | | |
| 25F8- | 10 | 10 | 10 | 10 | 10 | 10 | 10 | | |
| 2600- | 10 | 10 | 10 | 10 | 10 | 10 | 10 | 10 | State 18 |
| 2608- | 10 | 10 | 10 | 10 | 10 | 10 | 10 | | |
| 2610- | 10 | 10 | 10 | 10 | 10 | 10 | 10 | 10 | Not Used |
| 2618- | 10 | 10 | 10 | 10 | 10 | 10 | 10 | | |
| 2620- | 10 | 10 | 10 | 10 | 10 | 10 | 10 | | |
| 2628- | 10 | 10 | 10 | 10 | 10 | 10 | 10 | | |
| 2630- | 10 | 10 | 10 | 10 | 10 | 10 | 10 | | |
| 2638- | 10 | 10 | 10 | 10 | 10 | 10 | 10 | | |
| 2640- | 10 | 10 | 10 | 10 | 10 | 10 | 10 | 10 | State 19 |
| 2648- | 10 | 10 | 10 | 10 | 10 | 10 | 10 | | |
| 2650- | 10 | 10 | 10 | 10 | 10 | 10 | 10 | 10 | Not Used |
| 2658- | 10 | 10 | 10 | 10 | 10 | 10 | 10 | | |
| 2660- | 10 | 10 | 10 | 10 | 10 | 10 | 10 | | |
| 2668- | 10 | 10 | 10 | 10 | 10 | 10 | 10 | | |
| 2670- | 10 | 10 | 10 | 10 | 10 | 10 | 10 | | |
| 2678- | 10 | 10 | 10 | 10 | 10 | 10 | 10 | | |
| 2680- | 10 | 10 | 10 | 10 | 10 | 10 | 10 | 10 | State 1A |
| 2688- | 10 | 10 | 10 | 10 | 10 | 10 | 10 | | |
| 2690- | 10 | 10 | 10 | 10 | 10 | 10 | 10 | 10 | Not Used |
| 2698- | 10 | 10 | 10 | 10 | 10 | 10 | 10 | | |
| 26A0- | 10 | 10 | 10 | 10 | 10 | 10 | 10 | | |
| 26A8- | 10 | 10 | 10 | 10 | 10 | 10 | 10 | | |
| 26B0- | 10 | 10 | 10 | 10 | 10 | 10 | 10 | | |
| 26B8- | 10 | 10 | 10 | 10 | 10 | 10 | 10 | | |
| 26C0- | 10 | 10 | 10 | 10 | 10 | 10 | 10 | 10 | State 1B |
| 26C8- | 10 | 10 | 10 | 10 | 10 | 10 | 10 | | |
| 26D0- | 10 | 10 | 10 | 10 | 10 | 10 | 10 | 10 | Not Used |
| 26D8- | 10 | 10 | 10 | 10 | 10 | 10 | 10 | | |
| 26E0- | 10 | 10 | 10 | 10 | 10 | 10 | 10 | | |
| 26E8- | 10 | 10 | 10 | 10 | 10 | 10 | 10 | | |
| 26F0- | 10 | 10 | 10 | 10 | 10 | 10 | 10 | | |
| 26F8- | 10 | 10 | 10 | 10 | 10 | 10 | 10 | | |
| 2700- | 10 | 10 | 10 | 10 | 10 | 10 | 10 | 10 | State 1C |
| 2708- | 10 | 10 | 10 | 10 | 10 | 10 | 10 | | |
| 2710- | 10 | 10 | 10 | 10 | 10 | 10 | 10 | 10 | Not Used |
| 2718- | 10 | 10 | 10 | 10 | 10 | 10 | 10 | | |
| 2720- | 10 | 10 | 10 | 10 | 10 | 10 | 10 | | |
| 2728- | 10 | 10 | 10 | 10 | 10 | 10 | 10 | | |
| 2730- | 10 | 10 | 10 | 10 | 10 | 10 | 10 | | |
| 2738- | 10 | 10 | 10 | 10 | 10 | 10 | 10 | | |
| 2740- | 10 | 10 | 10 | 10 | 10 | 10 | 10 | 10 | State 1D |
| 2748- | 10 | 10 | 10 | 10 | 10 | 10 | 10 | | |
| 2750- | 10 | 10 | 10 | 10 | 10 | 10 | 10 | 10 | Not Used |
| 2758- | 10 | 10 | 10 | 10 | 10 | 10 | 10 | | |
| 2760- | 10 | 10 | 10 | 10 | 10 | 10 | 10 | | |
| 2768- | 10 | 10 | 10 | 10 | 10 | 10 | 10 | | |
| 2770- | 10 | 10 | 10 | 10 | 10 | 10 | 10 | | |
| 2778- | 10 | 10 | 10 | 10 | 10 | 10 | 10 | | |
| 2780- | 10 | 10 | 10 | 10 | 10 | 10 | 10 | 10 | State 1E |
| 2788- | 10 | 10 | 10 | 10 | 10 | 10 | 10 | | |
| 2790- | 10 | 10 | 10 | 10 | 10 | 10 | 10 | 10 | Not Used |
| 2798- | 10 | 10 | 10 | 10 | 10 | 10 | 10 | | |
| 27A0- | 10 | 10 | 10 | 10 | 10 | 10 | 10 | | |
| 27A8- | 10 | 10 | 10 | 10 | 10 | 10 | 10 | | |
| 27B0- | 10 | 10 | 10 | 10 | 10 | 10 | 10 | | |
| 27B8- | 10 | 10 | 10 | 10 | 10 | 10 | 10 | | |
| 27C0- | 10 | 10 | 10 | 10 | 10 | 10 | 10 | 10 | State 1F |
| 27C8- | 10 | 10 | 10 | 10 | 10 | 10 | 10 | | |
| 27D0- | 10 | 10 | 10 | 10 | 10 | 10 | 10 | 10 | Not Used |
| 27D8- | 10 | 10 | 10 | 10 | 10 | 10 | 10 | | |
| 27E0- | 10 | 10 | 10 | 10 | 10 | 10 | 10 | | |
| 27E8- | 10 | 10 | 10 | 10 | 10 | 10 | 10 | | |
| 27F0- | 10 | 10 | 10 | 10 | 10 | 10 | 10 | | |
| 27F8- | 10 | 10 | 10 | 10 | 10 | 10 | 10 | | |

TABLE II

| STATE | OPERATION |
|---|---|
| 0 | Power Up<br>(Relays set to open-high voltage condition)<br>Power On Delay Holds this State For One Second |
| 1 | Set High Voltage and Go to State 2 |
| 2 | Check Vlow - Go to State F if Vlow is False<br>Stay in this State if Vlow is True |
| 3 | Set Low Voltage and Go to State 4 |

TABLE II-continued

| STATE | | OPERATION |
| --- | --- | --- |
| 4 | | Wait for Delay True and Go to State 5 |
| 5 | | Wait for Iup and Go to State 6 |
| 6 | | Set Individual High Voltage According to Iup Reset TERMCNT and Go to State 7 |
| 7 | | Go to State 8, 9, A, B, C, D or E According to Iup |
| 8 | UP1 | ⎫ |
| 9 | UP2 | Wait For Iup in Other Phases, |
| A | UP3 | Vlow TRUE or TERMCNT |
| B | UP1, UP2 | - if Iup in Other Phases, Go to State 5 |
| C | UP1, UP3 | - if Vlow TRUE, Go to State 1 |
| D | UP1, UP2, UP3 | - if TERMCNT TRUE, Go to State 3 |
| E | UP2, UP3 | ⎭ |
| F | | Reset Counters and Wait Until TERMCNT is True, Then Go to State 3 |

The purpose of comparator 90 and delay circuit 92 is to provide an initial power start up delay. During this delay period the relays are forced into an open or high voltage condition and the state of PROM 82 is forced into a state 0 condition. The delay of the delay circuit 92 is a function of the RC time constant of resistor R10 and capacitor C15 which in the preferred embodiment of the present invention is set for approximately 1 second. This RC voltage is applied to the positive terminal of comparator 90, the negative terminal of which receives a voltage dependent upon the ratio of resistors R11 and R12 which form a voltage divider network. It will be understood that until the voltage on the RC network 92 rises above a voltage equal to the voltage at the negative terminal of comparator 90, the $\overline{\text{power on}}$ signal remains true. However, when the RC delay has been completed, the output of the comparator changes polarity and the $\overline{\text{power on}}$ signal becomes false thereafter permitting normal operation of latch 84 and quad flip-flop 86.

The purpose of flip-flop or latch 94 is to provide a steady state signal IUP3 in response to the short positive going pulse signal IUPC generated by the current sensor circuits described previously in conjunction with FIG. 2. This enables the analog circuitry of FIG. 2 to respond virtually immediately to a later current change while at the same time permitting a steady state signal available at the input terminal to the state machine. It will be understood that for purposes of convenience only, one latch 94 has been shown in FIG. 4 for the IUPC and IUP3 signals and that two additional such latches are actually in the circuit, one for each of the other two phases of current signals developed by the current sensors of FIG. 2. Finally, with respect to FIG. 4 it will be understood that the purpose of current buffers 96, 98 and 100 is to provide a suitable signal level and isolation for the relays 10, 12 and 14 in regard to the pick signals developed by quad flip-flop 86.

Figure 5:
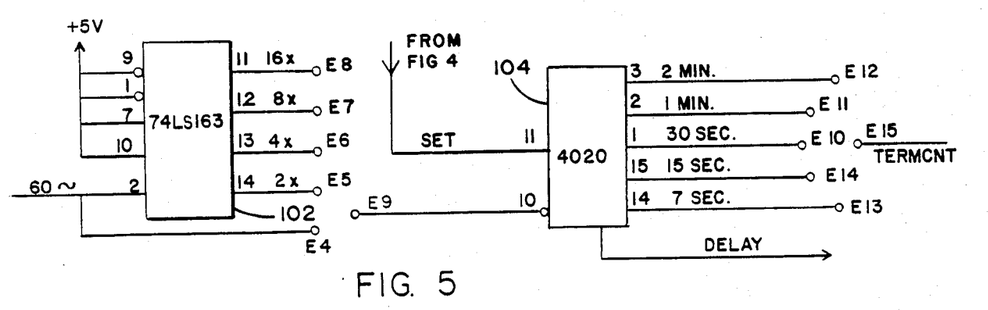
FIG. 5 is a block diagram schematic representation of the timing circuits of the present invention.

Reference will now be made to FIG. 5 for a more detailed description of the timing circuits 48 of the present invention. More specifically, as seen in FIG. 5 the timing circuits comprise a 4-bit counter 102 and a 12-bit counter 104. 4-bit counter 102 receives the 60 cycle pulse timing signal at its clock input and provides a plurality of jumper signals E4, E5, E6, E7 and E8 which provide timing signals of frequencies which are multiples of the 60 cycle input timing signal, those multiples being 1, 2, 4, 8 and 16, respectively. Normally, one of those jumper terminals would be connected to the jumper terminal E9 of 12-bit counter 104 as the input signal. The output of 12-bit counter 104 may be taped at a number of different stages to provide a total delay relative to the 60 Hertz input clock frequency of anywhere from 7 seconds to 2 minutes and each of these outputs is made available at jumper terminals E11–E14, one of which is selected for connection to jumper terminal E15 which provides the terminal count signal. In addition, the appropriate stage of counter 104 corresponding to approximately a ¾ second delay is brought out at terminal 6 as the delay signal which is applied to the PROM 82 as one of the input address signals.

It will be understood that the times shown on the output jumper terminals of counter 104 are indicated only for the direct connection of the 60 Hertz synchronization signal being applied to the input clock terminal E9 of the counter and that if instead, one of the multiplier terminals of counter 102 are jumpered to the input terminal of counter 104, the actual times are multiplied by the appropriate factor. Thus for example, if so desired, it is possible to make the period for terminal count equal to approximately 32 minutes by connecting the E8 output terminal of counter 102 to the E9 input terminal of counter 104 and then jumping the E12 output terminal of counter 104 to the E15 terminal count output terminal E15.

Figure 6:
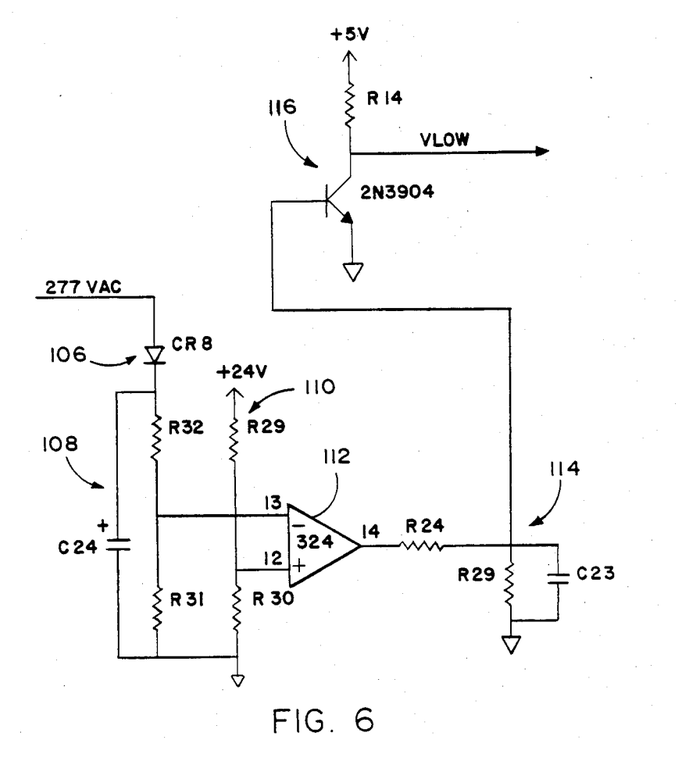
FIG. 6 is a schematic drawing of the voltage threshold circuits of the present invention.

Reference will now be made to FIG. 6 which is a schematic diagram of the line voltage threshold circuit that is used to develope the Vlow signal, one of the inputs to the PROM 82. More specifically, as seen in FIG. 6, the line voltage such as 277 volts AC in the exemplary illustration of FIG. 6 is applied to a rectifier 106 and filter/peak detector circuit 108 which applies a selected steady state signal to the negative terminal of comparator 112. The circuit also includes a reference circuit 110 which comprises a voltage divider network for applying a reference voltage to the positive terminal of comparator 112. It will be understood that the output of comparator 112 is a function of whether the input line voltage falls above or below a selected threshold. The output of comparator 112 is applied to a hysteresis circuit 114 comprising capacitor C23 and resistor R29 which has the effect of smoothing out short perturbations due to transients in the line voltage at or near the threshold level and thus avoids rapid changes in the output of the comparator affecting the Vlow signal. The output of hysteresis circuit 114 is applied to a transistor inverter 116 the collector junction of which is applied to the No. 3 terminal of PROM 82 of FIG. 4 to provide the Vlow signal. Accordingly, when Vlow is true that signal indicates that the AC line voltage has dropped below a threshold such as 90% of the nominal voltage level and causes the state machine to force the relays into their high voltage or open condition to compensate for the reduced line voltage condition.

Table III is provided herein for indicating the values of the various components illustrated in FIGS. 2 through 6 and used in the presently preferred embodiment of the invention.

TABLE III

| CAPACITORS | | | |
|---|---|---|---|
| C1 | .47uf | C21 | 1uf |
| C2 | N/U | C22 | 1uf |
| C3 | .47uf | C23 | N/U |
| C4 | N/U | C24 | 15uf 25V |
| C5 | .47uf | C25 | .1uf |
| C6 | N/U | C26 | .1uf |
| C7 | .1uf | C27 | .1uf |
| C8 | .1uf | C28 | 470uf |
| C9 | .1uf | C29 | .1uf |
| C10 | .1uf | C30 | .1uf |
| C11 | .1uf | C31 | 470uf 35V |
| C12 | N/U | C32 | 1000pf |
| C13 | N/U | | |
| C14 | N/U | INDUCTORS | |
| C15 | .1uf | | |
| C16 | .1uf | L1 | 25.mh |
| C17 | 1uf | L2 | 25.mh |
| C18 | 1uf | | |
| C19 | 1uf | | |
| C20 | 1uf | | |
| | | RESISTORS | |
| R1 | 1.5K | R21 | 270K |
| R2 | 1.5K | R22 | 1MΩ |
| R3 | 1.5K | R23 | 10Ω 10W |
| R4 | 1K | R24 | 10K |
| R5 | 4.7K | R25 | 270K |
| R6 | 4.7K | R26 | 1M |
| R7 | 4.7K | R27 | 5.1Ω 10W |
| R8 | 1.2K | R28 | — |
| R9 | 4.7K | R29 | 3.16K 1% ¼W |
| R10 | 270K | R30 | 8.25K 1% ¼W |
| R11 | 4.7K | R31 | 100K 1% ¼W |
| R12 | 4.7K | R32 | 1.9M 1% ¼W |
| R13 | 10K | R33 | 1K |
| R14 | 1K | R34 | 4.7K |
| R15 | 4.7K | R35 | 1K |
| R16 | 4.7K | R36 | 1K |
| R17 | 4.7K | | |
| R18 | 270K | P1 | 56K ¼W 5% |
| R19 | 1MΩ | P2 | |
| R20 | 10Ω 10W | P3 | |

The operation of the present invention will now be described in conjunction with Table II in addition to the figures already described. As seen in Table II there are two columns, namely, one column labeled STATE and one column labeled OPERATION. The state column lists the 16 possible states input to PROM 82 and corresponding to the 16 binary states on the input lines labeled STATE 1, STATE 2, STATE 4 and STATE 8, respectively. When the invention is first powered up, delay circuit 92 and comparator 90 cause the $\overline{\text{power on}}$ signal to be in a true state thereby setting latch 84 in a reset condition with all of the state signal at 0 and also setting the quad flip-flop 86 in a condition to force the relays into a high voltage or open condition. This power up condition is listed in Table II as state 0. As shown in Table II, the 0 state is retained for the power on delay period of 1 second in the preferred embodiment and then proceeds to STATE 1 at the occurrence of the first 60 cycle pulse after the $\overline{\text{power on}}$ signal goes false.

In state 1 the relays are set to the high voltage condition and the PROM goes to state 2 on the occurrence of the next 60 cycle pulse. As seen in Table II, in state 2 the AC line voltage threshold is tested. If Vlow is false indicating that the threshold voltage is exceeded, the state machine then does to state F. On the other hand, if Vlow is true indicating that the line voltage has fallen below the selected threshold level, the state machine remains in state 2 and the relays remain in their high voltage condition.

Assuming that the threshold level is exceeded by the AC line voltage, the next state of operation as indicated in Table II is state F. In this state counter 102 and 104 are reset and then when terminal count becomes true, the state machine goes to state 3. It will be understood that the terminal count will go true after the expiration of the period of time determined by the jumpered connectors connected to the input clock terminal E9 and the terminal count terminal E15 as discussed previously in conjunction with FIG. 5.

In state 3 the three relays 10, 12 and 14 of FIG. 1 are set to their low voltage condition and the state machine proceeds to state 4.

State 4 is merely a delay state in which the state machine waits for the delay signal to go true and then proceeds on to state 5. State 5 is the nominal waiting state for the state machine. The state machine waits in state 5 and remains there while all the relays have been set to the low voltage condition. While the machine remains in state 5, it is alert to any changes in IUP signals as well as any possible change in the Vlow signal. While the relays are in their low voltage condition, any change in an IUP signal will indicate that a load current in one or more phases has gone up in response to some added load such as the addition of fluorescent lights that may, for example, result from someone turning on another light switch. If any of the IUP signals change, the state machine goes to state 6 where it sets the individual high voltage condition in accordance with the IUP signals received. For example, if the IUP signals all indicate a current increase indicating such an increase has occurred in each of the phases of the AC load, then all of the relays are set to the high voltage condition. Similarly, if only one or two of the IUP signals have changed, indicating that only one or two of the load current phases has increased, only the appropriate relays are set to the high voltage condition. When any of these new conditions occur, the terminal count is reset by resetting counters 102 and 104 and the state machine proceeds to state 7.

State 7 is a multi-branch state directing the state machine to states 8, 9, A, B, C, D, or E according to the combination of IUP signal changes that have occurred. This multi-branch selection is made in accordance with the IUP signals as indicated to the right of the state numbers 8 through E in Table II. Thus for example, if only the IUP 1 signal has changed, the state machine will go from state 7 to state 8. In this state, the state machine awaits any one of three events. One event is an IUP change in any of the other phases. Another event is a Vlow true signal indicating that the line voltage has fallen below threshold and the third event is a true terminal count signal indicating that the counters have reached their full period. If the IUP signal changes in either of the other two phases, the state machine goes to state 5 from which state it will immediately proceed to states 6 and 7, setting the additional high voltage conditions for the relays of the other phases. However, if before this happens the Vlow signal goes true indicating a reduction in line voltage below the threshold, the state machine goes to state 1 where it sets all relays to the high voltage condition and proceeds to state 2 in accordance with the previously described operation of the state machine.

Finally, if the terminal count signal goes true, the state machine proceeds to state 3 where it sets the previously high voltage condition relay back to a low voltage condition and goes on to state 4 in accordance with the previously described operation. This latter event would occur when a light switch has been turned on, the relay has been set in the high voltage condition and a period corresponding to the selected count for terminal count has expired. These events indicate that the high voltage condition has been set for a sufficient period of time to assure that the newly turned on lights have completed turn on. Thereafter the relays will be set back to a low voltage condition to again reduce power consumption.

It will be understood that the operation in each of the other states, 9 through E is identical to the operation described for state 8, the actual state in which this operation is carried out being dependent only upon the behavior of the IUP signals which in turn depend upon the number and combination of sensed current increases in the three load line phases.

It will now be understood that what has been disclosed herein comprises a programmable power control apparatus that is particularly adapted for use with a device for reducing the power consumption of a load such as a bank of fluorescent lights. The invention is responsive to load current variations for temporarily increasing the load voltage in one or more phases of an AC system in which additional load has been added, such as by turning on additional fluorescent lights. As a result, it is now possible to respond to newly added load by temporarily increasing the load voltage to provide sufficient voltage to ignite the new lighting load while at the same time maximizing power consumption efficiency by obviating the prior art requirement for periodic load voltage increases whether or not load changes merit such increases.

The invention utilizes a PROM and latch combination herein called a state machine which enables a programmed sequence of operations for assuring that high voltage is applied at the proper time but only at the proper time. In addition, the invention utilizes circuits that are synchronized to the 60 cycle AC frequency so that high voltage activation may be accomplished at a selected time relative to current or voltage peaks to either minimize noise or arcing.

Those having skill in the art to which the present invention pertains, will, with the benefit of applicant's teaching herein, now perceive of various modifications and additions to the invention as described. By way of example, although a current sensing transformer circuit has been disclosed in the preferred embodiment herein, it will be understood that there are various other implementations for sensing parameters in response to load changes. For example, high impedance shunt circuits and primary transformer voltage drop sensing would also be appropriate for use in the present invention. Moreover, although a particular programmed digital circuit has been disclosed, it will now be clear that various other forms of programmable control may be applicable. For example, it will be seen that a microprocessor may be used advantageously in the digital circuits of the present invention. However, all such modifications and additions are contemplated to be within the scope of the invention which is to be limited only by the claims appended hereto.

I claim:

1. In an AC system of the type having a device for selectively reducing and increasing voltage applied to a load, an apparatus for sensing an increase in load current and for responding thereto by causing the load voltage device to increase load voltage for a selected period of time; the apparatus comprising:

means associated with said AC system for sensing load current in said system and for developing a signal indicative of a load current increase, and means connected to said load voltage device and responsive to said signal for causing an increase in load voltage for a selected period of time, said associated means comprising:

a transformer having a primary winding connected in series with said load, and a secondary winding, and an amplifier circuit, said transformer secondary winding being connected to said amplifier circuit for generating said signal indicative of load current increase, said amplifier circuit comprising a reference voltage source, and a comparator circuit for generating said signal indicative of load current increase only when said current increase exceeds a predetermined threshold corresponding to said reference voltage, said amplifier circuit also comprising means for varying the amplifier circuit gain whereby the amount of load current increase needed to exceed said threshold may be selectively varied.

2. In an AC system of the type having a device for selectively reducing and increasing voltage applied to a load, an apparatus for sensing an increase in load current and for responding thereto by causing the load voltage device to increase load voltage for a selected period of time; the apparatus comprising:

means associated with said AC system for sensing load current in said system and for developing a signal indicative of a load current increase, and means connected to said load voltage device and responsive to said signal for causing an increase in load voltage for a selected period of time, a digital device receiving said signal indicative of load current increase and generating a signal transmitted to said responsive means for causing said load voltage increase, said digital device being selectable for operation in either of two modes, said two modes being a sense mode for normal operation and a timing mode for periodic load voltage increase irrespective of load current increases.

3. In an AC system of the type having a device for selectively reducing and increasing voltage applied to a load, an apparatus for sensing an increase in load current and for responding thereto by causing the load voltage device to increase load voltage for a selected period of time; the apparatus comprising:

means associated with said AC system for sensing load current in said system and for developing a signal indicative of a load current increase, and means connected to said load voltage device and responsive to said signal for causing an increase in load voltage for a selected period of time, a digital device receiving said signal indicative of load current increase and generating a signal transmitted to said responsive means for causing said load voltage increase, and a line voltage threshold circuit having a comparator and a reference voltage source for generating a low line voltage signal transmitted to said digital device whenever the line voltage in said AC system falls below a selected threshold level, said digital device being responsive to said low line voltage signal for increasing said load voltage irrespective of load current status.

4. The apparatus recited in claims 2 or 3 wherein said digital device is programmable.

5. The apparatus recited in claim 4 wherein said digital device comprises a state machine having a programmable read only memory device, and a latch, at least one of the respective memory device output lines and input lines being connected respectively to an input line and an output line of said latch.

6. The apparatus recited in claim 5 wherein said digital device comprises a timing circuit for selecting the period of time that the load voltage remains increased in response to a sensed increase in load current.

7. The apparatus recited in claim 6 wherein said timing circuit comprises means for selecting said period of time in the range of about 7 seconds to about 32 minutes.

* * * * *